May 13, 1924.
J. ERDEY
1,493,743
LOCK FOR AUTOMOBILE STEERING WHEELS
Filed Aug. 8, 1921  2 Sheets-Sheet 2
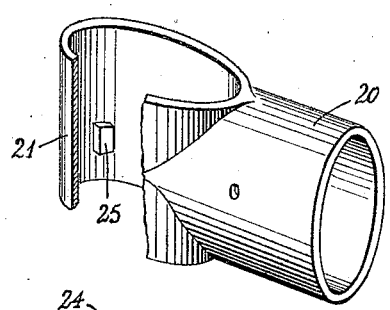
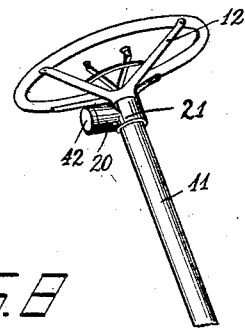
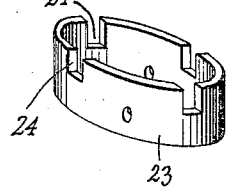
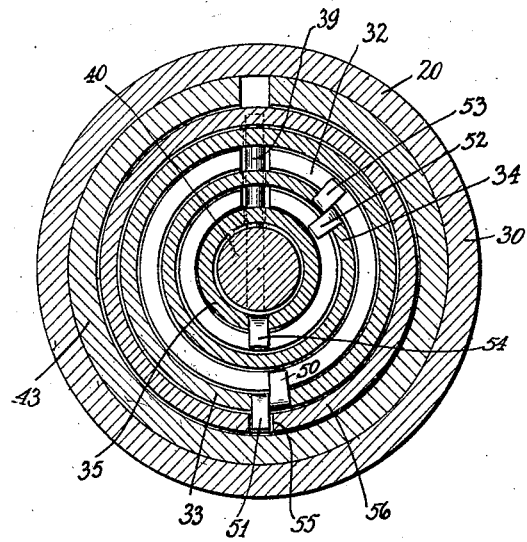
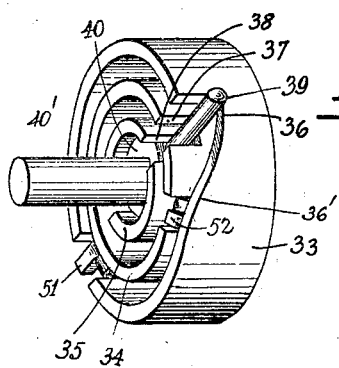
INVENTOR.
Joseph Erdey
BY
ATTORNEYS.

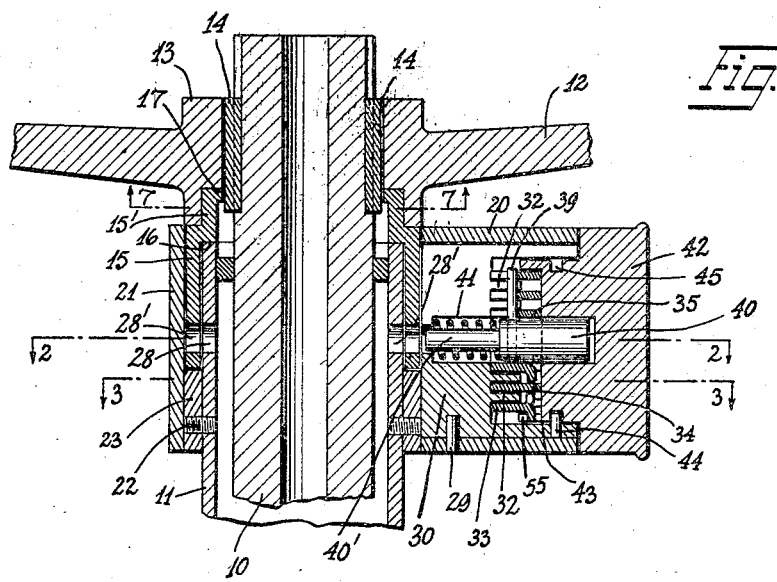
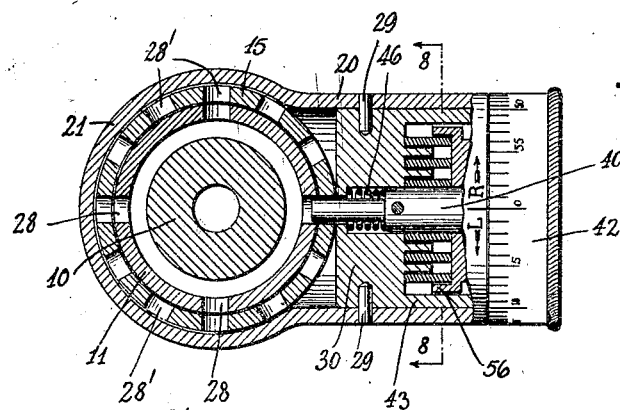
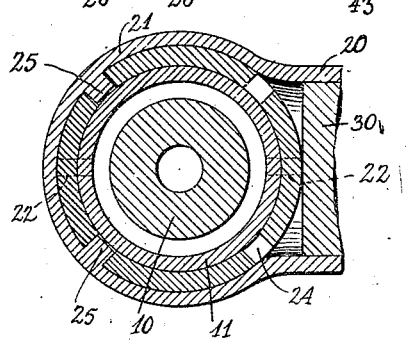

Patented May 13, 1924.

1,493,743

UNITED STATES PATENT OFFICE.

JOSEPH ERDEY, OF NEW YORK, N. Y., ASSIGNOR, BY MESNE ASSIGNMENTS, TO THE SAFELOCK CO., INC., OF CLEVELAND, OHIO, A CORPORATION OF DELAWARE.

LOCK FOR AUTOMOBILE STEERING WHEELS.

Application filed August 8, 1921. Serial No. 490,551.

*To all whom it may concern:*

Be it known that I, JOSEPH ERDEY, citizen of the Republic of Hungary, and resident of New York, in the county of New York and State of New York, have invented certain new and useful Improvements in Locks for Automobile Steering Wheels, of which the following is a specification.

This invention relates to a lock for automobile steering wheels for locking the wheel against rotation when the automobile is left standing, the present invention being a further development of one forming the subject matter of a previous application for patent filed by me on April 6, 1921, Serial No. 459,041.

The present invention has for an object to simplify the construction of the wheel locking means.

For further comprehension of the invention, and of the objects and advantages thereof, reference will be had to the following description and accompanying drawings, and to the appended claims in which the various novel features of the invention are more particularly set forth.

Fig. 1 of the drawings is a vertical axial sectional view showing the invention applied to an automobile steering wheel.

Fig. 2 is a horizontal section on the line 2—2 of Fig. 1, with part of the combination lock shown in plan view.

Fig. 3 is a fragmentary horizontal section on the line 3—3 of Fig. 1.

Fig. 4 is a detail perspective view of the lock casing.

Fig. 5 is a similar view of the notched ring whereby the casing is connected to the steering post.

Fig. 6 is a perspective view of a steering wheel with the lock applied thereto.

Fig. 7 is a horizontal section on the line 7—7 of Fig. 1.

Fig. 8 is an enlarged transverse section on the line 8—8 of Fig. 2.

Fig. 9 is a perspective view showing certain elements of the combination lock.

In the drawings the reference numeral 10 indicates the steering shaft of an automobile, and 11 the enclosing tubular column or post. These parts may be of any approved or usual construction. The steering wheel is shown at 12 and is formed with an integral hub 13 secured by keys 14 to the shaft 10.

Freely surrounding the upper end of the post 11 is a cylindrical member 15 whose upper end is diminished in size as at 15' and fits in a recess in the hub and prevents a downwardly facing shoulder 16 which seats on the upper end of the post, this member 15 having an inturned flange 17 on its upper end engaged by the keys 14 to lock the sleeve to the shaft 10, and constituting in effect, an extension of the hub 13. This hub extension 15 is adapted to be engaged by the bolt of a combination lock carried on the post 11 to lock the sleeve, and with it the wheel 12 against rotation.

The combination lock extends transversely to the shaft 10 and comprises a cylindrical casing 20 formed integral with, and projecting from one side of a sleeve 21 which surrounds the hub extension 15, projecting downward at its lower end beyond said extension. This sleeve 21 is secured to the post 11 by the following means: Fixed as by screws 22 to the post 11, just below the hub extension 15, is a collar 23, enclosed by the lower end of the sleeve 21. This collar 23 has a series of notches 24, preferably four in number, cut in the upper edge thereof, while the sleeve 21 has a pair of inwardly projecting lugs 25 which are adapted to seat in two of these notches. By providing the four notches the lock casing 20 may be mounted in a position extending either longitudinally or transversely of the automobile, as may be desired.

Formed in the wall of the post 11 near the upper end thereof are four evenly spaced holes 28 into any one of which according to the position of casing 20, the locking bolt is adapted to project. Formed in the hub extension 15 are a series of holes 28' which are adapted to be brought into registry with the locking bolt by turning wheel 12, these holes 28' being preferably comparatively closely spaced so as to bring one of them into registry with the locking bolt by turning the wheel 12 through a small arc.

The locking bolt is controlled by a combination lock carried by the casing 20, this lock being here shown as constructed in the following manner. Fitting snugly in the casing 20, to which it may be fixed by pins such as 29, is a head 30 formed on its outer face with a series of annular flanges 32 which act to confine a series of concentric rings arranged for free rotation on the head and numbered respectively 33, 34, and 35. These rings project beyond the flanges 32 and have their outer edges notched as indicated at 36, 37 and 38 respectively.

These notches 36, 37 and 38 are adapted to be brought into radial registry to receive a pin 39 projecting from the locking bolt 40, the latter being guided in a central chamber 41 formed partly in the head 30 and partly in a dial member 42 rotatable on the outer end of casing 20 which it closes, this dial member projecting within an annular peripheral flange 43 extending outward from the head 30, and being swiveled on the latter by means of a pin 44 on flange 43 engaging in a circumferential groove 45 in the dial member. The bolt 40 has a diminished forward portion 40′ which is adapted to engage in the registering holes 28, 28′ the post 11 and hub extension 15. A coiled spring 46, surrounding the forward portion of the bolt and bearing against the body 40 thereof, urges the bolt to unlocking position.

Formed on the outer ring 33 are adjacent inturned and outturned lugs 50 and 51, while the intermediate ring 34 has like lugs 52 and 53, and the inner ring has an outturned lug 54, these lugs all lying in a common plane. When the rings are rotated lugs 50, 53 are adapted to engage one another, likewise lugs 52 and 54, while the outturned lug 51 on the outer ring 33 projects into a notch 55 in an annular flange 56, on the dial element 42 which latter is numbered or provided with indicating marks as shown in Fig. 2.

By proper manipulation of the dial element 42 the notches 36, 37 and 38 may all be brought into registry with the pin 39, this being accomplished by moving the dial member alternately to right and left in the usual manner. When the bolt 40 is in locking position the pin 39 rests on the inner edges of rings 33, 34 and 35, and when the notches 36, 37, 38 register with the pin 39 the spring throws the bolt backward to releasing position. To enable the bolt to be thrown forward to locking position the notch 36 in outer ring 33 has one wall inclined as at 36′ and when ring is turned by dial member 42 the pin 39 rides up the inclined wall 36′ and moves the bolt forward, the wheel 12 being turned so as to move one of the holes 28′ in the hub extension 15 into registry with the bolt. If desired I may place indicating marks on the wheel hub 13 adapted to register with a suitable mark on the lock casing 20 to show when one of the openings 28′ registers with the bolt.

Having thus described my invention what I claim as new and desire to protect by Letters Patent of the United States is as follows:—

1. In a safety locking device for an automobile having a fixed hollow steering column and a steering post rotatably mounted therein; a steering wheel secured to said steering post, a hollow extension secured to said steering post below and independently of said steering wheel, so as to prevent access to said hollow extension and to prevent outward pull upon said steering wheel from being transmitted to said extension, a locking member to lock said hollow extension and steering post against rotation, and permutation locking means to control the operation of said locking member.

2. In a safety locking device for an automobile having a fixed hollow steering column and a steering post rotatably mounted therein; a steering wheel secured to said steering post, the hub of said steering wheel being provided on its lower face with a counterbore, a hollow extension secured to said steering post below and independently of said steering wheel, said hollow extension having a reduced upper end encased within said counterbore, so as to prevent access to said hollow extension and to prevent outward pull upon said steering wheel from being transmitted to said extension, a locking member to lock said hollow extension and steering post against rotation, and permutation locking means to control the operation of said locking member.

3. In a safety locking device for an automobile having a fixed hollow steering column and a steering post rotatably mounted therein; a steering wheel secured to said steering post, a hollow extension secured to said steering post below and independently of said steering wheel, so as to prevent access to said hollow extension and to prevent outward pull upon said steering wheel from being transmitted to said extension, said hollow extension and steering column being provided with apertures adapted to be brought into registry, a sliding locking bar extending laterally of said steering column and adapted to be engaged within said apertures to prevent rotation of said steering column, resilient means to normally urge said locking bar into engagement with said apertures and permutation locking means to actuate said locking bar against said resilient means and release said steering post, said locking bar being enclosed within said permutation locking means and unsecured thereto to prevent access to said locking bar or forcible withdrawal thereof.

4. The combination with an automobile having a hollow steering column, a steering post and a steering wheel secured to said post, of means to lock said post and wheel against rotation comprising a collar secured to said column having a plurality of spaced notches in its upper edge, a casing having an inwardly projecting lug adapted to be engaged within one of said notches, a hollow extension secured to said post and rotatably received between said column and casing, said extension provided with a plurality of spaced apertures adapted to be brought into alignment with an aperture in said steering column, said casing having a hollow boss extending laterally from said post, a locking bolt slidably mounted in said boss and locking device to control the movements of said bolt.

Signed at New York, in the county of New York and State of New York, this 18th day of July, A. D. 1921.

JOSEPH ERDEY.